Dec. 23, 1958 W. C. POPOVICH 2,865,398
HYDRAULIC BRAKE BLEEDING CHECK VALVE
Filed Jan. 21, 1955 2 Sheets-Sheet 1

WILLIAM C. POPOVICH
INVENTOR.

BY
ATTORNEYS

Dec. 23, 1958 W. C. POPOVICH 2,865,398
HYDRAULIC BRAKE BLEEDING CHECK VALVE
Filed Jan. 21, 1955 2 Sheets-Sheet 2

WILLIAM C. POPOVICH
INVENTOR.

BY
ATTORNEYS ated Dec. 23, 1958

2,865,398

HYDRAULIC BRAKE BLEEDING CHECK VALVE

William C. Popovich, Corry, Pa., assignor to Corpa, Inc., Corry, Pa., a corporation of Pennsylvania Application January 21, 1955, Serial No. 483,213

2 Claims. (Cl. 137—539)

The present invention relates to tools for bleeding the hydraulic brake systems of automotive vehicles and in particular provides a check valve which may be attached to the air bleed connector of the hydraulic brake.

The principal object of the present invention is to provide a device for attaching to the air bleed connector of the hydraulic brake of an automotive vehicle, and one of simple and economical construction.

Another object of the present invention is to provide a check valve for bleeding the air from a hydraulic brake system which will not permit air to be readmitted to the system when the piston in the master cylinder is returned to the released-pressure position.

A further object of the present invention is to provide a check valve of easy manufacture and assembly, and one which will fit all common makes of air bleed connectors of hydraulic brake systems, as well as one which is easily attached and is adjustable to suit the pressures of the brake system on which it may be used, it being known that certain wheel brakes receive less pressure than others.

These and other objects and advantages of the present invention will be readily apparent from the following description when considered with the accompanying drawings, in which.

Figure 1:
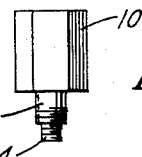
Figure 1 is a plan view in elevation of the present invention assembled.
Figure 2:
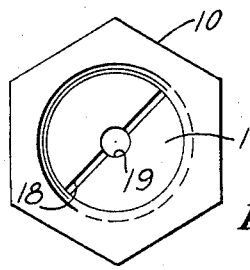
Figure 2 is a top plan view of the present invention.
Figure 4:
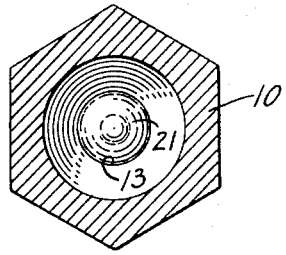
Figure 4 is a view in cross section on line 4—4 of Figure 3.
Figure 3:
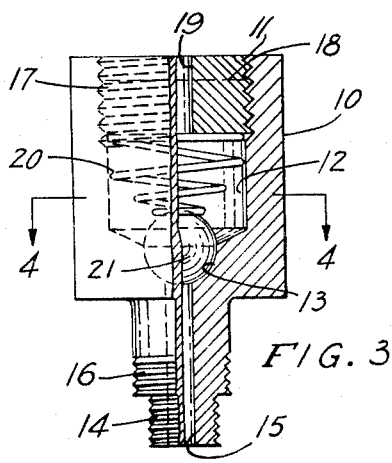
Figure 3 is a side view in cross section.
Figure 6:
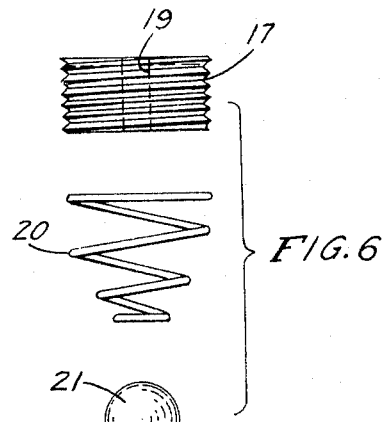
Figure 6 is an exploded view of the elements of the invention removed from the chamber.
Figure 5:
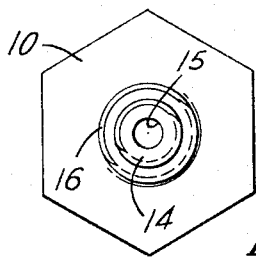
Figure 5 is an end view opposite to that of Figure 2.

Referring in more detail to the drawing, in which like numerals indicate like parts throughout the several views, the present invention is seen to consist of a body 10 of hexagonal shape formed with an open end 11 and a chamber 12 having its inner end formed as a valve seat 13 of semi-spherical shape.

The other end of the body 10 is provided with a nipple 14 having a bore 15 arranged concentrically with respect to the valve seat 13 and extending through it and being formed at its midlength with a shoulder 16, both the nipple and the shoulder having threads of common size and pitch to fit air bleed connectors of wheel cylinders.

The chamber 12 is threaded to receive a plug 17 which has a slot 18 for a screwdriver and is drilled with a bleed hole 19. A spring 20 in the chamber 12 is compressed by the plug 17 to bear against a ball valve 21 to keep it on the seat 13.

Figure 7:
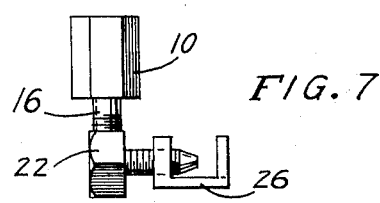
Figure 7 shows the invention assembled with an adapter for use on a special air bleed connector.
Figure 8:
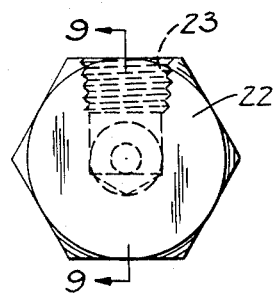
Figure 8 is an end view in elevation of the adapter.
Figure 9:
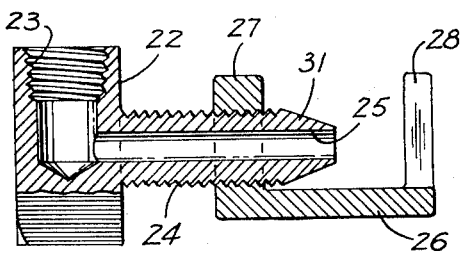
Figure 9 is a view in cross section of the adapter portion of the invention, as seen on line 9—9 of Figure 8.
Figure 10:
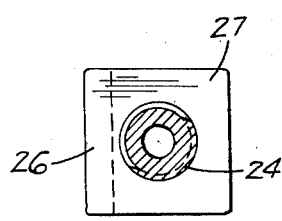
Figure 10 is an end view of the clamp portion of the adapter.
Figure 11:
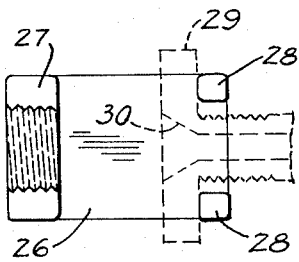
Figure 11 is a top plan view of the clamp portion.
Figure 12:
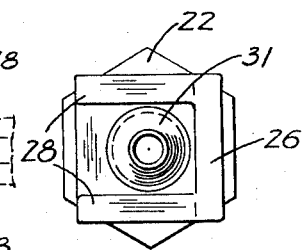
Figure 12 is an end view of the adapter and clamp portion opposite to the view of Figure 8.

In Figure 7 the body 10 is shown secured to an adapter 22 with its nipple 14 threadedly engaged in a bore 23 in one end of the adapter. The adapter has an elongated body 22 and is of hexagonal shape and is provided with another nipple 24 extending at a right angle to the bore 23 and having a bore 25 connecting with the bore 23. A clamp portion 26 of the adapter is of U-shape with one arm 27 drilled and tapped to receive the nipple 24 and with the other arm 28 cut away or bifurcated to engage each side of a flat-headed air bleed connector plug or screw shown in dotted lines at 29 in Figure 11. The particular air bleed connector screw 29 is formed with a conical opening 30 in which the conical end face 31 of the nipple 24 fits for an airtight connection when the nipple 24 is screwed up on the clamp portion 26.

In operation, in most automobile brake systems, an air bleed connector on each wheel cylinder is normally closed with a threaded plug which is removed and replaced with the nipple 14. Pressure on the piston in the master cylinder forces fluid and any entrapped air through the system to the wheel cylinders and to each air bleed connector. With the present invention in place, the entrapped air is forced through the nipple 14 into the chamber 12 and out the bleed hole 19, forcing the ball valve 21 off the seat 13.

When pressure is released and the piston in the master cylinder is moved on its upstroke to work up pressure and bring more fluid from the reservoir of the master cylinder, the ball valve prevents air from entering the system as it would normally do, if the air bleed connectors were not closed after each pressure stroke.

The adapter and clamp portion of the invention are used for the type of air bleed connector which has the non-removable plug or flatheaded screw 29, the body 10 being attached to the adapter after it has been secured on the screw with one half of the arm 28 on each side.

Whereas formerly two mechanics were required, one to open and close the air bleed connector screw plug and the other to pump the brake pedal, now one mechanic can install the device of the present invention and bleed one or all brake cylinders simultaneously removing the device when all the air is pumped out. Obviously, this is a saving in time and brake fluid.

While only a single preferred embodiment has been here shown and described, other embodiments of the present invention may be made within the scope of the appended claims without departing from the spirit of the invention.

What is claimed is:

1. A hydraulic bleeder valve comprising a body having an open end, a chamber inwardly of the open end of said body and having its inner end formed as a valve seat of semi-spherical shape, an externally threaded nipple projecting from the other end of said body, said nipple being provided with a bore concentrically arranged with respect to and in communication with said valve seat, a plug within said chamber closing the open end of said body, a ball in said chamber normally seated on said valve seat, a coil spring positioned within said chamber and bearing against said plug and said ball for biasing said ball to its seated position, an adapter having an elongated body threadably connected to said threaded nipple, a threaded nipple attached to said adapter and extending at a right angle therefrom, and a U-shaped clamp portion, one arm of said U-shaped clamp portion being threaded and receiving said nipple of said adapter, the other arm of said adapter being bifurcated for receiving an air bleeder connector on an automobile wheel.

2. The valve recited in claim 1 wherein said adapter nipple has a conical portion on the distal end thereof and said adapter nipple may be adjusted by rotating it in said threaded U-shaped portion to bring said conical portion into sealing engagement in the opening in an air bleeder connector screw in an automobile wheel.

References Cited in the file of this patent

UNITED STATES PATENTS

| | | |
|---|---|---|
| 1,429,566 | Carlile | Sept. 19, 1922 |
| 1,786,283 | Ardern | Dec. 23, 1930 |
| 2,009,433 | Carroll | July 30, 1935 |
| 2,240,612 | Ekstedt | May 6, 1941 |
| 2,256,516 | Carlin | Sept. 23, 1941 |
| 2,611,387 | Legerski | Sept. 23, 1952 |